United States Patent [19]

Fox

[11] 4,322,034
[45] Mar. 30, 1982

[54] HYDRAULIC RATE CONTROL SYSTEM FOR SPRAYERS

[75] Inventor: Robert E. Fox, Minburn, Iowa

[73] Assignee: Deere & Company, Moline, Ill.

[21] Appl. No.: 140,717

[22] Filed: Apr. 16, 1980

[51] Int. Cl.³ .................... A01C 23/04; A01G 25/09
[52] U.S. Cl. .................................... 239/155; 222/614
[58] Field of Search ................. 222/613, 614; 137/87;
239/155–158

[56] References Cited

U.S. PATENT DOCUMENTS 3,356,261 12/1967 Stein ............................. 239/156 X

FOREIGN PATENT DOCUMENTS 2841905 3/1979 Fed. Rep. of Germany ...... 239/156
89962 8/1967 France ................................ 239/157

Primary Examiner—Andes Kashnikow

[57] ABSTRACT

A hydraulic rate control system for maintaining a selected application rate at varying ground speeds. The application rate is selected through an operator control which permits the operator to dial in the spray tip size, the width of the spray pattern per tip and the desired spray rate in gallons per acre, and this application rate can be changed on the go. A ground-driven hydraulic oil pump directs its entire flow through a variable orifice, adjusted through manipulation of the operator control, and the oil pressure acts against a balance valve which maintains the pressure of the chemical to be sprayed equal to the oil pressure at the variable orifice. As the ground speed increases or decreases, the oil pressure and thus the chemical pressure increases or decreases accordingly to maintain the selected application rate.

3 Claims, 4 Drawing Figures

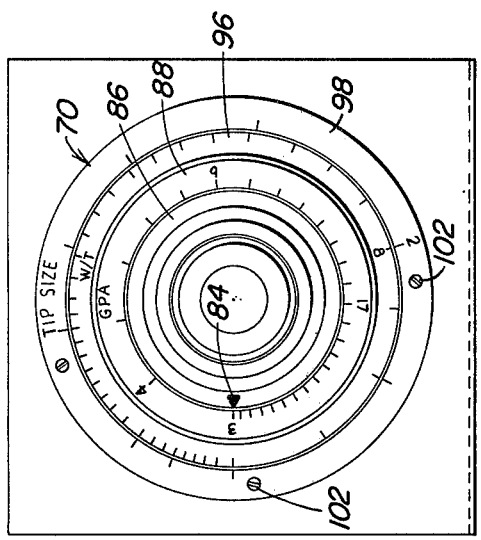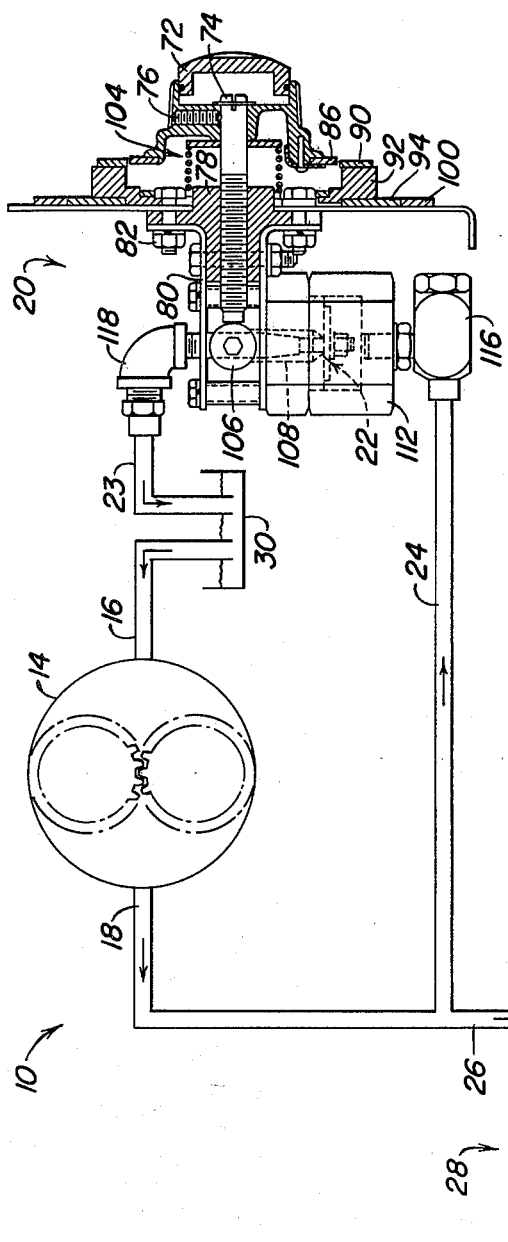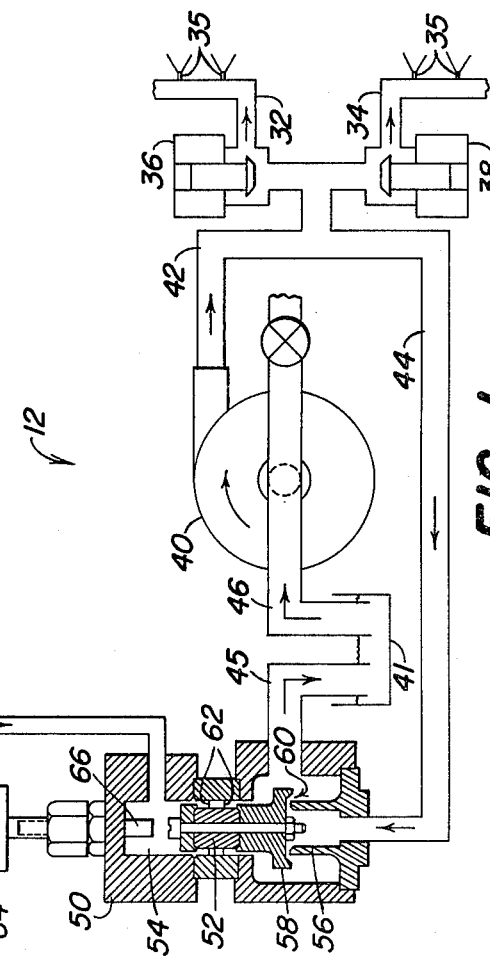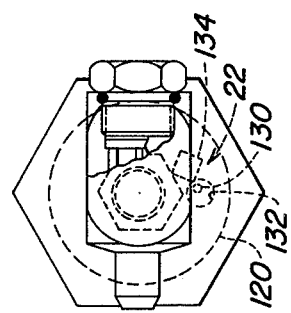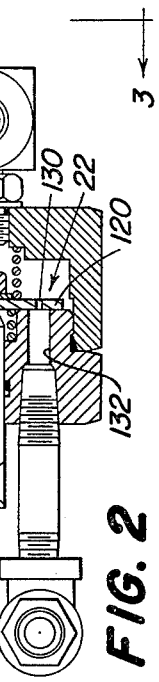

4,322,034

HYDRAULIC RATE CONTROL SYSTEM FOR SPRAYERS

BACKGROUND OF THE INVENTION

The present invention relates generally to agricultural spraying implements and more specifically to a hydraulic rate control system for such implements.

Agricultural chemicals such as herbicides, insecticides and fertilizers are often applied in liquid form to soil or crops. A solution of the chemical and a diluting liquid such as water are pumped from a tank through spray nozzles or the like to the soil or the crops being treated. For maximum effectiveness, economy and safety, the rate of application must be carefully controlled. As the speed at which the sprayer is propelled through the field is increased or decreased, the amount of chemical pumped must increase or decrease accordingly to maintain the desired gallons per acre coverage.

At times during the spraying operation, the operator must change the application rate to best suit the particular soil, crop, weed, or insect conditions or the like encountered. Often the rate change cannot be made easily and accurately.

The rate at which the chemical is applied is dependent on the nozzle or tip size and width of the spray pattern per tip, with the number of gallons per acre applied increasing as the tip size is increased or as the width per tip is decreased. A control is necessary which takes into account the tip size and the width per tip, and which utilizes a means for setting the desired gallons per acre coverage based on these factors and which is independent of the ground speed of the spraying implement.

Typical of prior art rate control systems are those in which chemical concentrates from a separate supply tank are injected at a rate proportional to the vehicle's land speed into water which is dispensed at a constant rate. Such a system is shown for example in U.S. Pat. No. 4,005,803 and requires separate tanks for storing the chemical and the dilutant.

Other rate control systems, such as shown in U.S. Pat. Nos. 3,550,854 and 3,670,962, utilize a centrifugal governor driven from a ground wheel to control the flow of liquid from the tank to the discharge nozzles so that the amount of solution applied per acre remains constant regardless of ground speed. Fairly complex and expensive drive, governor, and governor-controlled valve assemblies are required.

Other types of systems have used ground-driven pumps for delivering the chemical to the nozzles at a pressure related to speed so that the gallons per acre sprayed remains essentially constant regardless of speed. However, the high pressure and high capacity requirements of present-day sprayers make such a system impractical since the output is limited, for example by wheel traction. Systems which use electronic regulating means have been devised for regulating sprayer output in proportion to rate of advance, such as that shown in U.S. Pat. No. 4,083,494. Such systems, however, often require variable displacement pumps or electrically operated valves which increase the cost and complexity of the system, and which require connecting the system to a source of electrical power.

Another regulating system described in U.S. Pat. No. 3,784,100 utilizes a selector valve directly in the main flow line to the spray nozzles. The valve divides the flow between the nozzles and a bypass line leading to the inlet of the pump. A ground speed valve is adjusted to correspond to the vehicle ground speed. The device provides a predetermined application rate for a particular vehicle ground speed and crop row spacing, but requires the use of interchangeable valve cores with different sized orifices and the use of a chart for correlating ground speed, crop row spacing, application rate and pressure to determine the required operating pressure which is monitored with a meter. The control valve generally requires readjusting if the ground speed changes, and changing the spray rate requires more than simply dialing in the desired rate on the control. The valve system used directly controls the solution to be sprayed which is common in many of the prior art examples, and therefore the chemical must be piped to the control at the operator's station, usually requiring more plumbing and increasing the danger of subjecting the operator to contact with the chemical if a leak occurs.

In many of the prior art devices in which there is direct contact between the valve and the chemical to be applied corrosion of the control valve is a problem. In addition, the chemical often has a sticky base which will clog the valve and prevent accurate metering. Dirt or sediment in the solution to be sprayed can also cause clogging and result in malfunctioning of the metering system.

SUMMARY OF THE INVENTION

Therefore it is an object of the present invention to provide a rate control system for a sprayer which overcomes many of the disadvantages of the prior art devices.

It is an object of the present invention to provide a rate control system for a sprayer which maintains the desired application rate regardless of speed and which provides a convenient operator control for selecting the desired rate taking into account the tip size and width of the spray pattern per tip. A further object is to provide such a system in which the spray rate can be changed on the go using a single operator control.

It is a further object to provide a hydraulic rate control system for a sprayer in which the spray rate is easily adjusted by a single control without the need to consult a chart and is maintained constant regardless of the ground speed of the sprayer. Still another object is to provide such a system which is easily calibrated.

It is yet another object of the present invention to provide a hydraulic rate control system for a sprayer which regulates sprayer output pressure in accordance with ground speed and which is relatively simple and inexpensive to manufacture, not requiring complex valve or pump structures or electrical controls. It is still another object to provide such a hydraulic system with an operator controlled regulator valve which is not directly in communication with the chemical solution being sprayed so the solution does not have to be pumped through the valve near the operator and so that problems of corrosion and clogging of the valve are reduced or eliminated.

It is a further object of this invention to provide a hydraulic rate control system for a sprayer in which the output pressure is regulated by an operator-control valve which includes a scale for dialing in the desired application rate taking into account the tip size and width per tip and which allows the operator to accurately set the desired spray rate on the go to adjust for changing conditions.

The hydraulic rate control system of the present invention is provided with a ground-driven hydraulic oil pump which directs its flow through a variable orifice, adjusted by an operator control which has a scale directly calibrated for tip size, width per tip and gallons per acre. A balance valve maintains the pressure of the chemical solution to be sprayed equal to the oil pressure at the variable orifice. As the ground speed increases or decreases, the pressure at the orifice changes accordingly and causes the pressure of the chemical solution to vary in like manner.

For a given tip size and width per tip on the calibrated scale, the desired gallons per acre can be easily set and maintained without the use of a separate calculator and without further adjustments as the ground speed of the sprayer varies. The spray rate can be changed on the go by simply moving the control until it indicates the desired gallons per acre setting. No gear changes or multi-step adjusting procedures are required. The system eliminates the need to pump the chemical solution under pressure through the operator control. Problems of corrosion and clogging of the control are minimized. The ground wheel driven pump capacity only has to be sufficient to provide regulation since a separate pump delivers the solution to be sprayed to the nozzles or tips, reducing the size of the ground-driven pump and eliminating the problem of ground wheel slippage due to excessive pump loading. The desired spray rate is maintained without sophisticated controls, valves, or pumps, reducing cost and increasing the reliability and the life of the system.

These and other objects, features, and advantages of the present invention will be apparent from the following description and the accompanying drawings.

BRIEF DESCRIPTION OF THE DRAWINGS

FIG. 1 is a diagrammatic illustration of the hydraulic control system of the present invention and including a side view of the operator control, partially in section;

FIG. 2 is a view partially in section of the operator control;

FIG. 3 is a view of the orifice portion of the operator control taken along lines 3—3 of FIG. 2; and FIG. 4 is a front plan view of the dial on the operator control shown in FIG. 2.

DESCRIPTION OF THE PREFERRED EMBODIMENT

The hydraulic rate control system for a sprayer diagrammatically represented in FIG. 1 includes separate hydraulic regulator and chemical solution spraying systems 10 and 12, respectively. The hydraulic regulator system 10 includes a fixed displacement pump 14, preferably of the gear type although other types could be used, driven by a ground wheel (not shown) in a conventional manner. The volumetric output of the pump 14 varies with the ground speed of the sprayer. Connected to the pump 14 are an input line 16 and an output line 18. An operator control valve indicated generally at 20 and having a variable orifice 22 is connected between a line 23 and a return line 24 communicating with the output line 18 so that the oil pump 14 directs its entire flow through the orifice 22. The output line is also connected to a control line 26 which in turn is connected to one section of a balance bypass valve 28, the operation of which is described in detail below. A reservoir 30 maintains a supply of oil or other suitable fluid which is circulated in the hydraulic regulator system 10.

The chemical solution spraying system 12 includes supply hoses 32 and 34 for directing the solution to the left- and right-hand booms of a conventional sprayer. The booms mount conventional nozzle tips 35 of various sizes which can be arranged in numerous spray patterns depending on the type of coverage desired. Spray valves 36 and 38 are provided for selectively opening and closing the fluid path to the supply hoses 32 and 34 for right-hand or left-hand operation of the sprayer.

A chemical supply pump 40 provides solution from a supply tank 41 to the supply hoses 32 and 34 via a high pressure output line 42. A bypass or return line 44 is connected to the output line 42 and directs the solution under pressure through the bypass valve 28 to a line 45 which empties into the tank 41. A low pressure input line 46 from the pump 40 communicates with the tank 41. The balance valve 28 maintains the pressure in the line 44 and therefore in the line 42 feeding the booms equal to the pressure in the control line 26 in a manner described in detail below. The pump 40 is driven in a conventional manner preferably from the power take-off of the towing vehicle or from a pump drive if the sprayer is part of a self-propelled unit.

The valve 28 includes a body 50 housing a piston assembly 52 and defining a control chamber 54 communicating with the control line 26. A chemical input port 56 cooperates with the lower end 58 of the piston assembly 52 to provide a variable orifice indicated generally at 60, the size of which is dependent upon the position of the piston assembly 52 in the body, which in turn is dependent upon the pressures acting on the ends of the piston assembly. The control chamber 54 and the area of the balance valve 28 surrounding the orifice 60 are separated by a pair of rolling diaphrams 62 so that the fluid in the hydraulic regulator system 10 remains separated from the chemical solution in the spraying system 12. A manual control valve 64 is provided for static sprayer operation and includes a lower stem 66 which, when the valve is extended into the control chamber 54, contacts the piston assembly 52 urging it downwardly to decrease the size of the opening 60.

The function of the balance valve 28 when the manual control valve is in the upper position as shown in FIG. 1 is to regulate the chemical pressure in the line 44 so that it is equal to the oil pressure in the control line 26. The oil pressure is dependent on the speed of the ground-wheel driven pump 14 and the setting of the variable orifice 22 of the operator control valve 20. The piston assembly 52 is free to move vertically depending upon the pressure of the oil in the line 26 and therefore in the control chamber 54, and the pressure of the chemical in line 44. The areas against which the fluid pressures act on either side of the piston assembly 52 are equal, and if the pressure in line 44 rises above the pressure in line 26, the piston will rise, increasing the size of the orifice 60 so that more of the chemical solution will flow through the bypass line 44 and the line 45 into the tank 41 to reduce the output pressure of the supply pump 40. If the pressure at the input port 56 falls below the pressure in the line 26, the piston will drop, decreasing the size of the orifice 60 to reduce the flow through the bypass line 44 and cause the output pressure of the pump to increase.

The pressure in the line 26 which controls the pressure in the line 44 is determined by the speed of the ground wheel driven gear pump 14 and by the size of the variable orifice 22 which depends on the setting of the operator control valve or regulator 20. The valve 20 includes a dial assembly 70 with a knob 72 secured on a bolt 74 by a setscrew 76. The bolt 74 is threaded through a body portion 78 of the valve assembly which in turn is secured to a valve frame 80 by a plurality of bolts 82. The bolt 74 moves axially as it is turned by the knob 72. An arrow or indicator 84 fixed to an annular plate 86 rotates with the knob. A gallons per acre (GPA) scale 88 is provided on a second annular ring 90 approximately concentric with ring 86. The ring 90 is mounted on an annular base 92 which is secured to a third ring 94 which includes a width per tip scale (W/T) 96. The scales 88 and 96 are fixed with respect to each other, but are movable with respect to a tip size scale 98 on a fourth ring 100 fixed to the frame 80 by a series of sheet metal screws 102. A spring and washer assembly 104 is mounted coaxially with the bolt 74 between the knob 72 and the body 78 to provide a friction surface for the knob 72 to prevent unwanted setting changes.

The inner end of the bolt 74 contacts a circular disk member 106 which is secured to the side of a shaft 108 by a bolt 110. The shaft 108 extends upwardly from a body portion 112 of the valve assembly 20. The lower portion of the bolt 108 extends into a chamber 114 located in the body portion 112. The chamber 114 communicates with the return line 24 through a connector and filter 116 and with the line 23 through a line connector 118. An orifice disk 120 is retained on the end of the shaft 108 with a washer and nut assembly 122 and is maintained against an upper lip section 124 of the body 112 in the chamber 114 by a spring 126 acting between the lower portion of the chamber and the lower portion of the disk. The shaft 108 includes a portion with a square cross-section which receives a square aperture in the disk 120 to prevent relative rotation of the parts. A torsion spring 128 having one end secured through the orifice disk 120 and the other end fixed with respect to the body 112 biases the shaft 108 about its axis so that the circular disk 106 remains abutted against the bolt 74. A small circular hole 130 is provided in the circular disk 120 and remains aligned with a circular bore 132 which forms a passage between the connector 118 and the chamber 114. A second hole 134, essentially square, is provided in the circular disk 120 such that a corner of the hole lies approximately the same radial distance from the center of the disk 120 as the small hole 130. As the bolt 74 is unthreaded from the body 78, the torsion spring 128 rotates the disk 120 and the square hole 134 moves from the position shown in FIG. 3 to over the bore 132, increasing the size of the variable orifice 22. The small hole 130 also shifts towards the left from the position shown in FIG. 3 but remains in communication with the bore 132 even when the square hole 134 is in the maximum clockwise position. As the bolt 74 is threaded into the body 78, the size of the orifice 22 decreases until the square hole 134 is completely out of communication with the circular bore 132. The hole 130 allows some oil to be pumped through the hydraulic regulator system 10 even when the operator control valve is adjusted to the least flow position.

As best seen in FIG. 4, the dial assembly 70 is arranged somewhat in the fashion of a circular slide rule with the three scales 88, 96 and 98 graduated logarithmically. The arrow or indicator 84 which turns with the knob 72 as the bolt 74 is turned within the valve body 78 indicates the chemical application rate in gallons per acre on the scale 88. As noted previously, the gallons per acre scale 88 and the width per tip scale 96 rotate in unison. The tip size scale 98 is stationary, and when setting up the dial assembly 70 the indication for the particular width per tip dimension used with the sprayer is moved to a position opposite the tip size on the scale 98. The GPA scale moves with the width per tip (W/T) scale.

As the knob 72 is rotated in the counter-clockwise direction from the position shown in FIG. 4, the screw 74 moves outwardly with respect to the body 78. This allows the torsion spring to move the disk 106 and the shaft 108 so that the square hole 134 in the circular disk 120 moves over the bore 132 to increase the size of the variable orifice 22, increasing the flow of oil through the bypass line 24 and therefore decreasing the pressure in the line 26. Rotating the knob 72 in the clockwise direction decreases the amount of the coincidence between the bore 132 and the square hole 134 to restrict flow in the line 24 and increase pressure in the line 26.

The orifice formed by the holes 130 and 134 in alignment with the bore 132 is controlled in such a manner by the knob 72 that the position of the control knob is approximated by the following equation:

$$N = K_1 \log P \qquad (1)$$

where N is the position of the control knob, P is the desired pump output pressure, and $K_1$ is a constant. By having the position of the control knob a function of the log of the pressure, the dial assembly 70 can be used as a slide rule for setting tip size and width per tip since at a given speed:

$$GPA = K_2 \sqrt{P} \times \frac{\text{tip size}}{\text{width per tip}} \qquad (2)$$

By adjusting the width per tip scale 96 by moving the third ring 94 with respect to the outer ring 100, the division function is achieved. The multiplication function is achieved by moving the knob 72 with the pointer 84 which at the same time changes the size of the orifice 22. Therefore if the tip size is increased, the width per tip scale 96 would have to be rotated in the counter-clockwise direction (FIG. 4) until the appropriate width per tip indication is aligned with the new tip size. The gallons per acre scale 88, which is connected to the width per tip scale 96 also is rotated in the counter-clockwise direction. Therefore the indicator 84 will not have to be rotated as far in the clockwise direction to achieve the same gallons per acre rate as with the smaller tip size. Consequently the orifice 22 is larger and therefore the pressure at the line 26 is lower for a given GPA setting when a larger tip size is used.

During operation of the sprayer as the ground speed is increased, the oil pressure out of the ground wheel driven pump 14 increases as follows:

$$P = K_3 S^2 \qquad (3)$$

where P is the pump output pressure, S is the ground speed of the sprayer and $K_3$ is a constant. The spray nozzles at the boom provides flow as follows:

$$Q = K_4 \sqrt{P} \qquad (4)$$

where Q is the flow and P is the pressure at the spray nozzle, which in this case is equal to the pressure at the output of the pump 14 because of the action of the balance valve 28. Consequently, as the ground speed increases, flow increases proportionately according to the equation:

$$Q = KS. \qquad (5)$$

In operation, the appropriate width per tip indication on the scale 96 is moved adjacent to the tip size on the scale 98. The knob 72 is turned so that the indicator 84 is aligned with the desired chemical application rate in gallons per acre on the scale 88. The booms are extended and the valves 36 and 38 are opened. The pump 40 is operated to supply fluid under pressure to the line 42 in the spraying system 12. As the sprayer moves across the field the pump 14 is driven at a speed proportional to the ground speed and supplies oil under pressure through line 26 to the balance valve 28 which maintains the pressure in the return line 44 and thus in the supply hoses 32 and 34 to the booms equal to the pressure in the line 26. If the ground speed increases or decreases, the pressure in line 26 varies accordingly, and the valve 28 acts to maintain the pressure in the line 44 at the same level so that the application rate remains essentially constant. If, for some reason, the operator wishes to change the application rate, he simply moves the indicator 84 opposite the desired gallons per acre coverage on the scale 88 thereby increasing or decreasing the size of the orifice 22 in the operator control valve 20. As the indicator 84 is moved in the clockwise direction, and the size of the orifice is decreased, the oil flow is restricted through the valve 20 and the output increases. The orifice 22 increases in size if the indicator 84 is turned toward a smaller gallons per acre setting on the scale 88, and therefore more oil flows through the line 24 to decrease the pressure output of the pump 14 which, in turn, decreases the pressure of the chemical solution in the line 42. The output of pump 14 varies in accordance with the equation (3) above.

Having described a preferred embodiment of the invention, various modifications within the spirit and scope of the invention will become apparent to those skilled in the art and can be made without departing from the underlying principle of the invention. Therefore, the invention should not be limited to the specific embodiment described and illustrated, but should be commensurate with the proper scope of the following claims.

I claim:

1. A spray rate control system for a mobile sprayer with a spray nozzle member having one of a plurality of tip sizes and one of a plurality spray widths for applying a liquid to a medium at a rate dependent on the size and width, comprising:
   a first source of hydraulic pressure having a fluid pressure outout which varies in accordance with the ground speed of the sprayer,
   a second source of hydraulic pressure including an inlet for receiving liquid, an outlet for supplying the liquid under pressure to the nozzle member, and a flow line connecting the outlet with the spray nozzle member,
   means responsive to the fluid pressure output for varying the pressure in the flow line in proportion to the variations in the fluid pressure output to maintain a preselected application rate, and
   operator control means for adjusting the preselected application rate comprising, variable position valve means connected to the first source for varying the fluid pressure output in direct relation to the valve position, a computing device including an adjustable spray rate indicator operably associated with the valve means, said computing device having a plurality of input means, including a tip size input and a spray width input for entering an indication of said tip size and spray width of said nozzle on the computing device and adjusting said rate indicator in accordance with tip size and spray width.

2. The invention described in claim 1 wherein the means responsive comprises a bypass valve connected between the flow line and the inlet, the valve having a valving member biased toward a spray liquid blocking position by the fluid pressure output and toward a spray liquid passing position by the pressure of the spray liquid.

3. The invention described in claim 1 wherein the computing device comprises circular slide rule structure, said spray width and tip size inputs comprising circular scales rotatable relative to each other with one of said scales including a spray volume per area scale.

* * * * *

UNITED STATES PATENT AND TRADEMARK OFFICE
CERTIFICATE OF CORRECTION

PATENT NO. : 4,322,034

DATED : March 30, 1982

INVENTOR(S) : Robert E. Fox

It is certified that error appears in the above—identified patent and that said Letters Patent is hereby corrected as shown below:

Column 8, line 10, delete "outout" and insert -- output --.

Signed and Sealed this

Tenth Day of August 1982

[SEAL]

Attest:

Attesting Officer

GERALD J. MOSSINGHOFF

Commissioner of Patents and Trademarks